(12) United States Patent
Blumhofer (10) Patent No.: US 9,460,504 B2
(45) Date of Patent: Oct. 4, 2016

(54) METHOD FOR MODIFYING A MEDICAL DATA SET

(75) Inventor: Andreas Blumhofer, Neubiberg (DE)

(73) Assignee: Brainlab AG, Feldkirchen (DE)

(*) Notice: Subject to any disclaimer, the term of this patent is extended or adjusted under 35 U.S.C. 154(b) by 57 days.

(21) Appl. No.: 13/816,553

(22) PCT Filed: Aug. 24, 2010

(86) PCT No.: PCT/EP2010/062319
§ 371 (c)(1),
(2), (4) Date: Feb. 12, 2013

(87) PCT Pub. No.: WO2012/025143
PCT Pub. Date: Mar. 1, 2012

(65) Prior Publication Data
US 2013/0142407 A1    Jun. 6, 2013

(51) Int. Cl.
*G06K 9/00* (2006.01)
*G06T 7/00* (2006.01)

(52) U.S. Cl.
CPC ........... *G06T 7/0012* (2013.01); *G06T 7/0083* (2013.01); *G06T 2207/20096* (2013.01); *G06T 2207/20104* (2013.01); *G06T 2207/20128* (2013.01); *G06T 2207/30004* (2013.01); *G06T 2207/30008* (2013.01)

(58) Field of Classification Search
None
See application file for complete search history.

(56) References Cited

U.S. PATENT DOCUMENTS

| | | | |
|---|---|---|---|
| 5,239,591 A * | 8/1993 | Ranganath | G01R 33/563 345/442 |
| 6,740,883 B1 * | 5/2004 | Stodilka | G01T 1/1648 250/363.03 |
| 7,327,862 B2 * | 2/2008 | Murphy et al. | 382/128 |
| 8,808,188 B2 * | 8/2014 | Banet et al. | 600/485 |
| 2002/0177775 A1 * | 11/2002 | Torp et al. | 600/443 |
| 2003/0053667 A1 * | 3/2003 | Paragios et al. | 382/128 |
| 2008/0020362 A1 * | 1/2008 | Cotin | G09B 23/285 434/267 |
| 2010/0135551 A1 * | 6/2010 | Hautvast et al. | 382/128 |
| 2010/0303328 A1 * | 12/2010 | Ciofolo et al. | 382/131 |
| 2012/0065513 A1 * | 3/2012 | Lee | G01S 7/52065 600/443 |

FOREIGN PATENT DOCUMENTS

WO    2008/135882 A2    11/2008

OTHER PUBLICATIONS

International Search Report for International Application No. PCT/EP2010/062319 dated Nov. 11, 2010.
Pham et al., "Current Methods in Medical Image Segmentation", Annual Review of Biomedical Engineering, vol. 2, Aug. 2000, pp. 315-337.

(Continued)

*Primary Examiner* — Nancy Bitar
(74) *Attorney, Agent, or Firm* — Tucker Ellis LLP (57) ABSTRACT

A method for modifying a first data set, which is called the target data set and represents the contour of an anatomical object, the method comprising the steps of: —matching a second data set, which is called the template data set and comprises a template for the modification and a template of the object, to the target data set such that the object template in the template data set matches the object in the target data set, thereby also adapting the modification template; —applying the adapted modification template to the target data set.

18 Claims, 6 Drawing Sheets

(56) References Cited

OTHER PUBLICATIONS

Ding et al., "Automatic Segmentation of Femur Bones in Anterior-Posterior Pelvis X-Ray Images", Computer Analysis of Images and Patterns, Aug. 2007, pp. 205-212.

Zitova et al., "Image Registration Methods: A Survey", Image and Vision Computing, vol. 21, No. 11, Oct. 2003, pp. 977-1000.

Kang et al., "Interactive 3D Editing Tools for Image Segmentation", Medical Image Analysis, Mar. 2004, pp. 35-46.

Seitz et al., "Plenoptic Image Editing", $6^{th}$ International Conference on Computer Vision, Jan. 1998, pp. 17-24.

\* cited by examiner

METHOD FOR MODIFYING A MEDICAL DATA SET

This application is a national phase of International Application No. PCT/EP2010/062319 filed Aug. 24, 2010 and published in the English language.

The present invention relates to a method for modifying a medical data set representing the contour of an anatomical object and to a medical imaging system for performing the method.

The use of data sets representing the contour of an anatomical object is well known in medical applications. In a particular case, the data set represents medical image data, either in 2D or 3D, in which the contour of the object is identified, for example by segmentation. Several methods for identifying the contour of the object in the data set are known from the prior art. However, for some medical applications or due to the individual preferences of a physician, it can be necessary to modify the contour. The present invention relates to a method for automatically carrying out such a modification.

Such a method, as well as a medical imaging system and a program for performing the method, are specified in the independent claims. Advantageous embodiments are specified in the dependent claims.

The present invention relates to a method for modifying a first data set, which is called the target data set and represents the contour of an anatomical object. In particular, the contour of the anatomical object—also called the target object—in the target data set is modified. The first step of the method involves matching a second data set, which is called the template data set and comprises a template for the modification and a template of the object, to the target data set such that the object template in the template data set matches the object in the target data set, thereby also adapting the modification template. The matching step in particular comprises a step of amending the template data set such that a match is achieved. In this step, the object template in the template data set is preferably amended such that it exhibits the best possible congruence with the contour of the object in the target data set. The matching step can for example be performed by elastic or rigid image fusion. In simple implementations, the matching step comprises scaling, rotating or distorting the object template or any combination of these. In more complex approaches, supporting points of the object template are displaced until the object template exhibits the best possible congruence with the contour of the object in the target data set.

During matching, the whole template data set and not just the object template is amended. If a simple transformation rule, including scaling, rotating or distorting or any combination of these, is sufficient for matching, then the same transformation rule is applied to the modification template in the template data set. If a transformation based on supporting points is performed, in which supporting points forming a mesh can be displaced independently, then the transformation rule is extrapolated to the modification template, for example by applying the displacement vectors used for supporting points on the border of the object template to the modification template. In any case, after the matching step, the modification template is adapted to the shape and/or size of the anatomical object represented by the target data set. The term "thereby" used above covers at least two cases, wherein in the first case, the modification template is adapted at the same time as the object template is matched to the contour of the anatomical object, and in the second case, matching the object template to the contour of the anatomical object results in a transformation rule which is then applied to the modification template in a separate sub-step.

In a second step according to the present invention, the adapted modification template is applied to the target data set. Applying the adapted modification template means that the modification defined by the modification template is made to the target data set. The adapted modification template in particular defines a change in the contour of the object represented by the target data set.

In one implementation, the adapted modification template is extracted from the matched template data set, and the contour of the object in the target data set is modified by extending or diminishing the contour in accordance with the adapted modification template. In this second step, the target data set is modified by using a modification template adapted to the properties of the contour of the target object represented in the target data set. This means that a modification which has been generated once can be applied to a plurality of data sets automatically in accordance with the method of the invention, without the need for manual interaction. In general, the modification template can optionally represent multiple modifications to be carried out to the contour of the anatomical object, in particular representing an order in which the modifications are to be performed.

Preferably, the modification template represents a first number (0, 1 or more) of first areas or volumes to be added to the contour of the target object and a second number (0, 1 or more) of second areas or volumes to be subtracted from the contour of the target object. Preferably, the sum of the first number and the second number is at least 1. If the target data set is a 2D data set, then the modification template preferably represents areas, and if the target data set is a 3D data set, then the modification template preferably represents volumes. The contour of the target object can be reduced to a point such that the modified contour is then the contour of a sub-object which is a part of the anatomical object. For example, the anatomical object can be the brain stem which is modified such that the contour in the target data set represents the pons after the modification. On the other hand, the contour of the target object can be extended such that the modified contour represents a higher-ranking object of which the anatomical object is a part. For example, if the anatomical object is the femur head, the modified contour might represent the femur head and the femur neck.

In addition or as an alternative, the modification template represents a contour, the so-called replacement contour, to replace the contour of the anatomical object, which is the original contour, in the target data set. This replacement contour could fully cover the original contour, could be fully covered by the original contour, could be overlapping with the original contour or could be disjunctive with the original contour. This is particularly useful if the original contour can be easily identified in the target data set, but the replacement contour is the contour of interest.

In a preferred embodiment, the object template in the template data set comprises the contour of an actual test object generated by performing medical imaging on a test person. Medical imaging can for example be performed using X-ray, CT or MRT. Medical imaging is used to generate image data (preferably in two or three dimensions and optionally over time as an additional dimension) of anatomical structures (such as soft tissues, bones, organs, etc.) of a (human) body. The target object can be a complete anatomical structure, a set of anatomical structures or a part of an anatomical structure.

Preferably, the contour of the actual test object in the image data is determined automatically, for example by segmentation. In segmentation, pixels or voxels of the image data are assigned to objects or structures. Alternatively, the object template in the template data set comprises a generic model of the target object. In both these variants, the modification template is preferably generated by manually adding the modification template to the template data set, for example by graphically manipulating the contour or the model displayed on a display device. This manipulation is preferably performed by a user.

In another alternative, the object template in the template data set comprises an atlas containing a generic model of the anatomical object. An atlas typically consists of a plurality of generic models of objects, wherein the generic models of the objects together form a complex structure. The atlas of a femur, for example, can comprise the head, the neck, the body, the greater trochanter, the lesser trochanter and the lower extremity as objects which make up the complete structure. The atlas of a brain, for example, can comprise the telencephalon, the cerebellum, the diencephalons, the pons, the mesencephalon and the medulla as the objects which make up the complex structure. One application of an atlas is in the segmentation of medical images, wherein the atlas is matched to medical image data and by comparing the image data with the matched atlas, a point (a pixel or voxel) of the image data can be assigned to an object of the matched atlas, thereby segmenting the image data into objects.

The present invention is based on the presence of a template data set. Generating the template data set, in particular generating the modification template, is an additional aspect of the invention. The next embodiment and an alternative to this embodiment describe methods for generating the modification template. However, methods other than those described are of course also possible.

In one embodiment of the invention, the modification represented by the modification template is made to the template data set, for example to a visual representation of the object template on a display device, manually. Alternatively, the modification is made to a third data set—also called the model data set—for example, to a visual representation of the model data set on a display device. The modification made to the model data set is then transferred into the template data set. This is particularly advantageous if the object template in the template data set represents an atlas and the model data set represents image data or a generic model of the target object, since a modification which has been manually added to the model data set and shows a natural representation of the target object is thus transferred into a rather abstract atlas.

In a first implementation of this alternative, the modification is made to the model data set representing the contour of an actual test object generated by performing medical imaging on a test person, or to a model data set representing the contour of a generic object. The model data set is then matched to the atlas such that the image data of the actual test object or the generic object match the atlas or the object in the atlas, thereby also adapting the modification. The adapted modification in the matched model data set is then transferred into the template data set as the modification template.

In a second implementation of the aforementioned alternative, a modification is made to a model data set representing the contour of an actual test object generated by performing medical imaging on a test person, or to a model data set representing the contour of a generic object. The atlas is then matched in a matching step to the object in the model data set by finding an appropriate transformation rule. The modification is then transformed using a transformation rule which is inverse to the transformation rule used in the preceding matching step. Finally, the transformed modification is transferred into the template data set as the modification template.

If the model data set represents the contour of an actual test object, for example in image data, then the model data set is preferably segmented such that the contour of the test object is identified. The basis on which the modification is made to the model data set is then analogous to the state of the target data set before the adapted modification template is applied if the target data set represents image data of a patient, as indicated below.

On the basis of the description of the invention so far, the template data set can represent different types of data. Similarly, the target data set can also represent different types of data.

In a preferred embodiment, the target data set represents image data generated by performing medical imaging on a patient, wherein the image data represent at least the anatomical object. If the object template represents the contour of an actual test object or a generic model, then the contour or model, respectively, is matched to the target object in the image data. If the object template represents an atlas, then the generic model of the target object contained in the atlas is matched to the target object in the image data. Optionally, the image data are segmented before the matching step, in order to identify the contour of the anatomical object in the image data. Alternatively, the contour of the anatomical object can be found in the image data in the matching step, thus omitting the preceding segmentation step. If the object template comprises an atlas, the whole atlas or just the generic model of the anatomical object within the atlas can be matched to the image data in the matching step of the present invention. This would mean that segmentation is included in the matching step. Matching the whole atlas to the image data is preferable because the contour of the anatomical object is then identified in the image data with greater certainty.

In one alternative, the target data set represents a generic model of the anatomical object, wherein the model is matched to the contour of the anatomical object in image data generated by performing medical imaging on a patient. If the object template comprises the contour of an actual test object, then this contour is matched to the matched generic model in the first step of the invention. If the object template comprises a generic model of the anatomical object, then this generic model which forms the object template is preferably the generic model which is matched to the contour of the anatomical object in the image data. In this case, only one step of matching a generic model to the contour is necessary.

In another alternative, the target data set represents an atlas containing a generic model of the anatomical object, wherein the atlas is matched to image data generated by performing medical imaging on a patient and the image data represent at least the anatomical object. As explained above, the criterion for the matching step is for example either the whole atlas or just the model of the anatomical object within the atlas. The criterion identifies the requirement to be fulfilled in order to end the matching step. If the model is the sole criterion, then the best match of this model is found irrespective of the matches of other objects in the atlas. A compromise is possible in which the match of the whole atlas is the criterion, but with an emphasis on the model of the anatomical object.

If the object template comprises the contour of an actual test object or a generic model, then the adapted modification template is preferably extracted from the template data set and applied to the target data set. If the object template comprises an atlas, then the whole object template atlas can be copied into the target data set before the adapted modification template is applied.

In most cases, applying the adapted modification template to the target data set preferably means extracting the adapted modification template from the template data set and modifying the contour of the anatomical object in accordance with the adapted modification template. The only exception is if the object template comprises an atlas and the target data set represents an atlas, in which case it is preferable to copy the object template, i.e. the atlas, from the matched template data set before modifying the contour of the anatomical object in accordance with the adapted modification template.

In one embodiment of the invention, the modification template is an average of multiple input templates. For example, a physician makes a desired modification to a plurality of image data sets of different test persons, and these desired modifications are then averaged for use as a modification template.

When the adapted modification template is adapted to the target data set, a gap between the contour of the anatomical object in the target data set and the applied modification template may result. In this case, the method preferably also comprises the step of correcting a border between the object and the adapted modification template, in particular in order to close such a gap. This correction is preferably based on the distances between the voxels or pixels within the target data set and the contour of the object and on the distances between the voxels or pixels within the matched template data set and the contour of the object template and/or the adapted modification template. In one implementation, a first distance data set is generated which comprises the distances from the joined contour of the object template and the modification template in the template data set, and a second distance data set is calculated which comprises the distances from the contour of the object template only. For example, a pixel or voxel within the contour has a positive distance, while a pixel or voxel outside the contour has a negative distance. The second distance data set is then subtracted from the first distance data set. A third distance data set is then calculated which comprises the distances from the contour of the object in the target data set. The difference between the first distance data set and the second distance data set is then added to the third distance data set. From this sum, a new contour which for example exhibits no gaps can be reconstructed.

Optionally, the adapted modification template is amended on the basis of the target data set. In particular, if the modification template is for example an addition to the contour of the object, and the target data set is an image data set, then the grey values of the image data can be used to amend the adapted modification template. In an example, the object is the femoral head and the contour of the femoral head is to be extended such that it includes the beginning of the femoral neck. The adapted modification template is then checked against the image data in order to amend the adapted modification template such that it extends over the whole width of the neck, but not beyond.

It is possible to perform an additional manual correction of the modified data set after modification, in order to further adapt the modified data set to the given requirements.

Optionally, the modification template in the template data set can be amended on the basis of this manual correction, such that the manual correction is automatically used for future modifications.

The method in accordance with the invention is a data processing method. The data processing method is preferably performed using technical means, in particular a computer. The computer in particular comprises a processor and a memory in order to process the data, in particular electronically. The calculating steps described are in particular performed by a computer. Steps of determining or calculating are in particular steps of determining data within the framework of the technical data processing method, in particular within the framework of a program. A computer is in particular any kind of data processing device. A computer can be a device which is generally thought of as such, for example desktop PCs or notebooks or netbooks, etc., but can also be any programmable apparatus, such as for example a mobile phone or an embedded processor. In particular, a computer can comprise a system (network) of "sub-computers", wherein each sub-computer represents a computer in its own right. A computer in particular comprises interfaces in order to receive data and/or to perform an analogue-to-digital conversion. The data are in particular data which represent physical properties and/or are generated from technical signals. The technical signals are in particular generated by means of technical detection devices and/or analytical devices.

The present invention also relates to a medical imaging system comprising a calculating unit configured to perform the method as explained above.

The invention also relates to a program which, when running on a computer or when loaded onto a computer, causes the computer to perform the method as outlined above and/or relates to a program storage medium on which the program is stored (in particular in a non-transitory form).

Within the framework of the invention, computer program elements can be embodied by hardware and/or software (this also includes firmware, resident software, micro-code, etc.). Within the framework of the invention, computer program elements can take the form of a computer program product which can be embodied by a computer-usable or computer-readable storage medium comprising computer-usable or computer-readable program instructions, "code" or a "computer program" embodied in said medium for use on or in connection with the instruction-executing system. Such a system can be a computer; a computer can be a data processing device comprising means for executing the computer program elements and/or the program in accordance with the invention. Within the framework of this invention, a computer-usable or computer-readable medium can be any medium which can include, store, communicate, propagate or transport the program for use on or in connection with the instruction-executing system, apparatus or device. The computer-usable or computer-readable medium can for example be, but is not limited to, an electronic, magnetic, optical, electromagnetic, infrared or semiconductor system, apparatus or device or a medium of propagation such as for example the Internet. The computer-usable or computer-readable medium could even for example be paper or another suitable medium onto which the program is printed, since the program could be electronically captured, for example by optically scanning the paper or other suitable medium, and then compiled, interpreted or otherwise processed in a suitable manner. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

It is within the scope of this invention to combine one or more or all of the features of two or more embodiments as described in this document to form a new embodiment. Furthermore, features which are not essential to the invention can be omitted from the embodiments.

The present invention shall now be explained in more detail by referring to the appended figures. These figures show.

Figure 1:
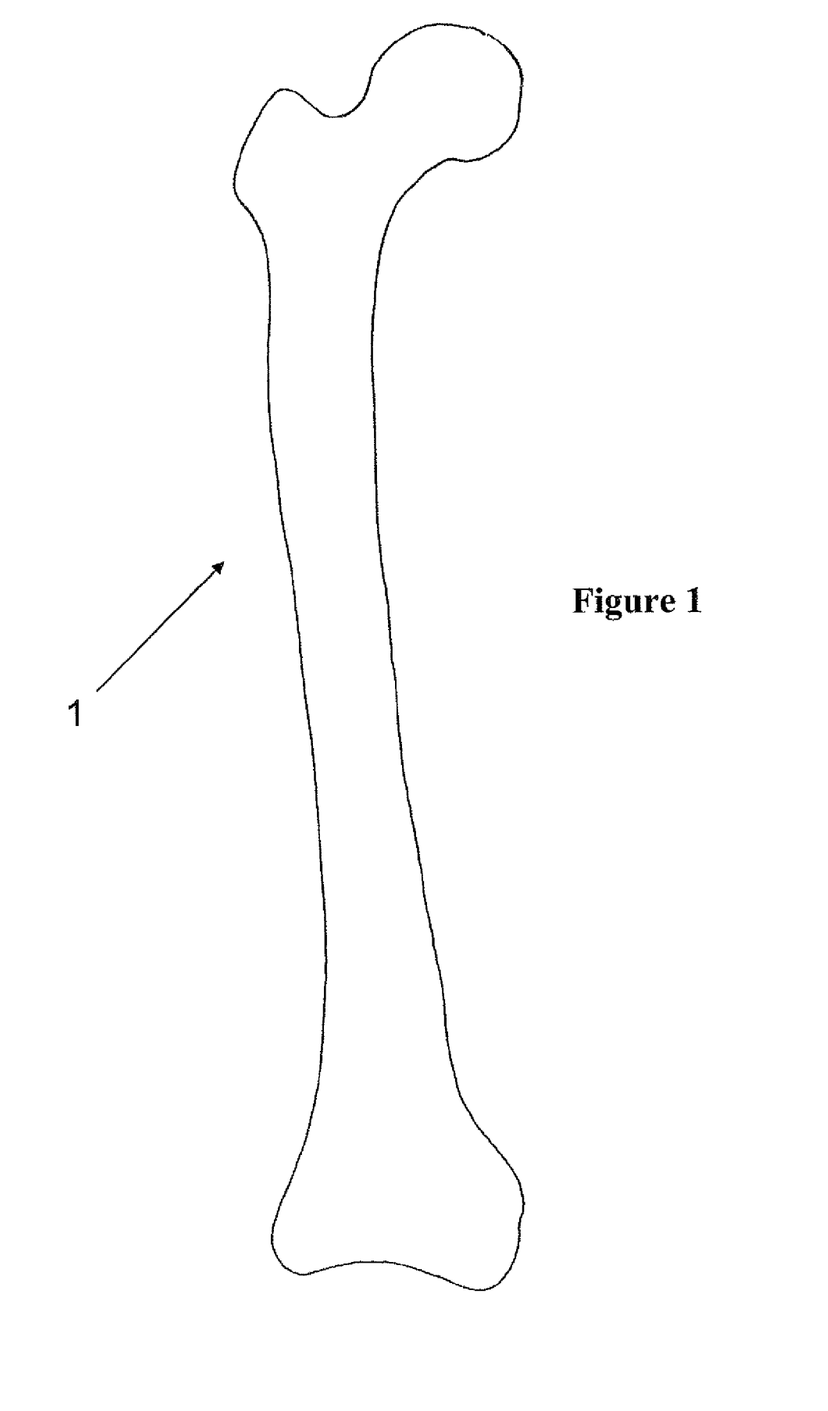
FIG. 1 the femur of a test person.

FIG. 1 shows the femoral bone 1 of a test person in a medical image dataset. For reasons of clarity, only the outline of the femur 1 is shown, and the grey values which such image data usually consist of have been omitted. In this simplified example, the femur 1 is considered to comprise a head, a neck and a body.

Figure 2:
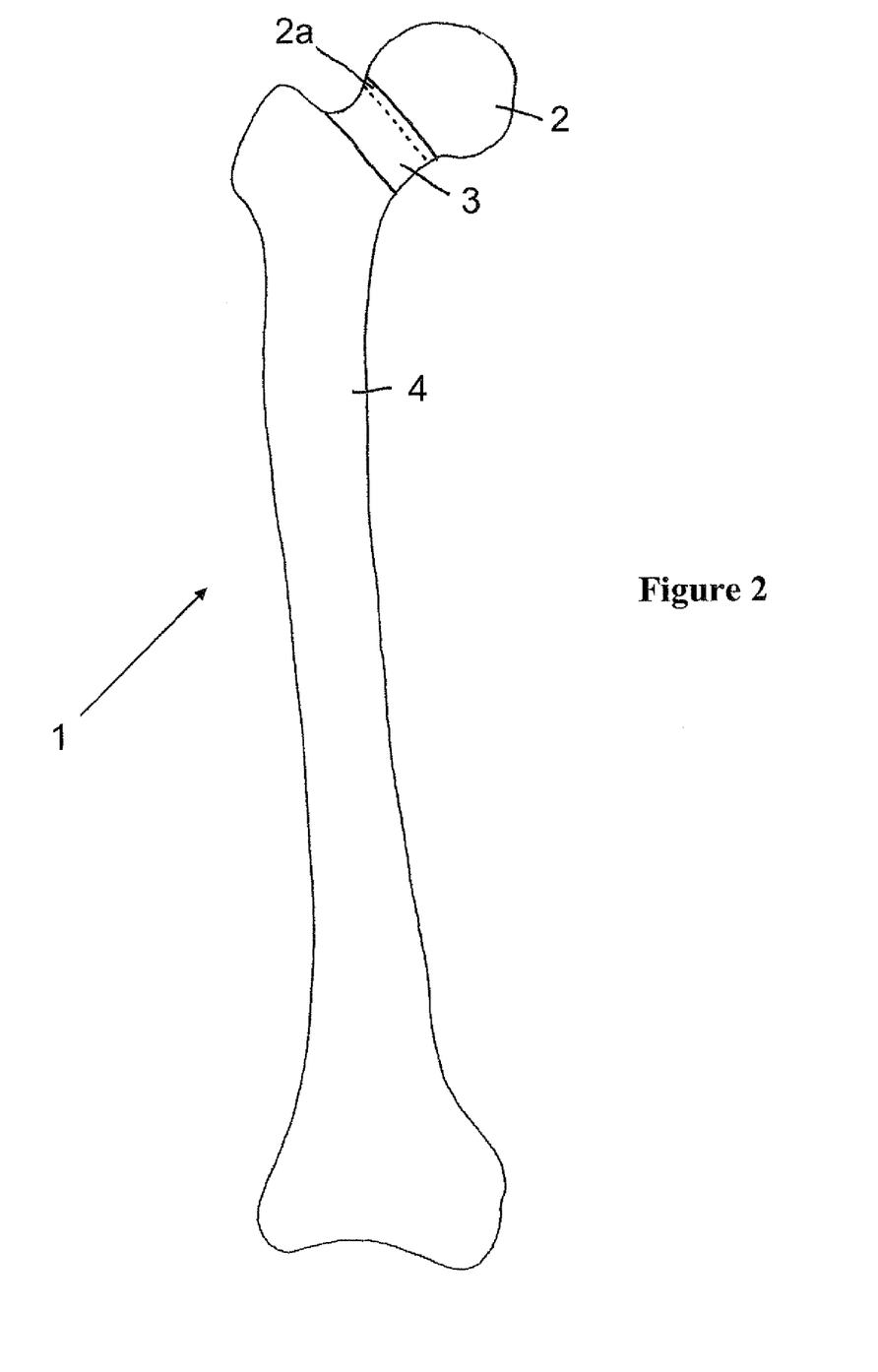
FIG. 2 the segmented femur of FIG. 1.

FIG. 2 shows the femur 1 of FIG. 1 after automatic segmentation. Preferably, though not necessarily, segmentation is performed by matching a femur atlas to the image data of the femur 1. The femur atlas is matched to the image data by image fusion, wherein the atlas is scaled and/or deformed. Objects which make up the atlas can then be identified in the image data. In the present example, the femur 1 is segmented into the head 2, the neck 3 and the body 4. Borders between the segments, or objects, are represented by solid lines.

There may be reasons for which the automatic segmentation result is unsatisfactory. In the present case, a part of the neck 3 has to be assigned to the head 2. The head 2 is an anatomical object having a contour which is represented by the image data.

In FIG. 2, the area 2a is assigned to the head 2, for example by image manipulation as performed by a physician. It is desired that an equivalent area be assigned to all future femoral heads. The new border between the femoral head 2 and the femoral neck 3 is indicated by a dashed line. This re-assignment represents a modification which is to be performed on a data set. In the present example, image data representing at least the contour of the head 2 and the additional area 2a are used as a template data set. In this template data set, the contour of the head 2 is the object template and the area 2a is the modification template.

Figure 3:
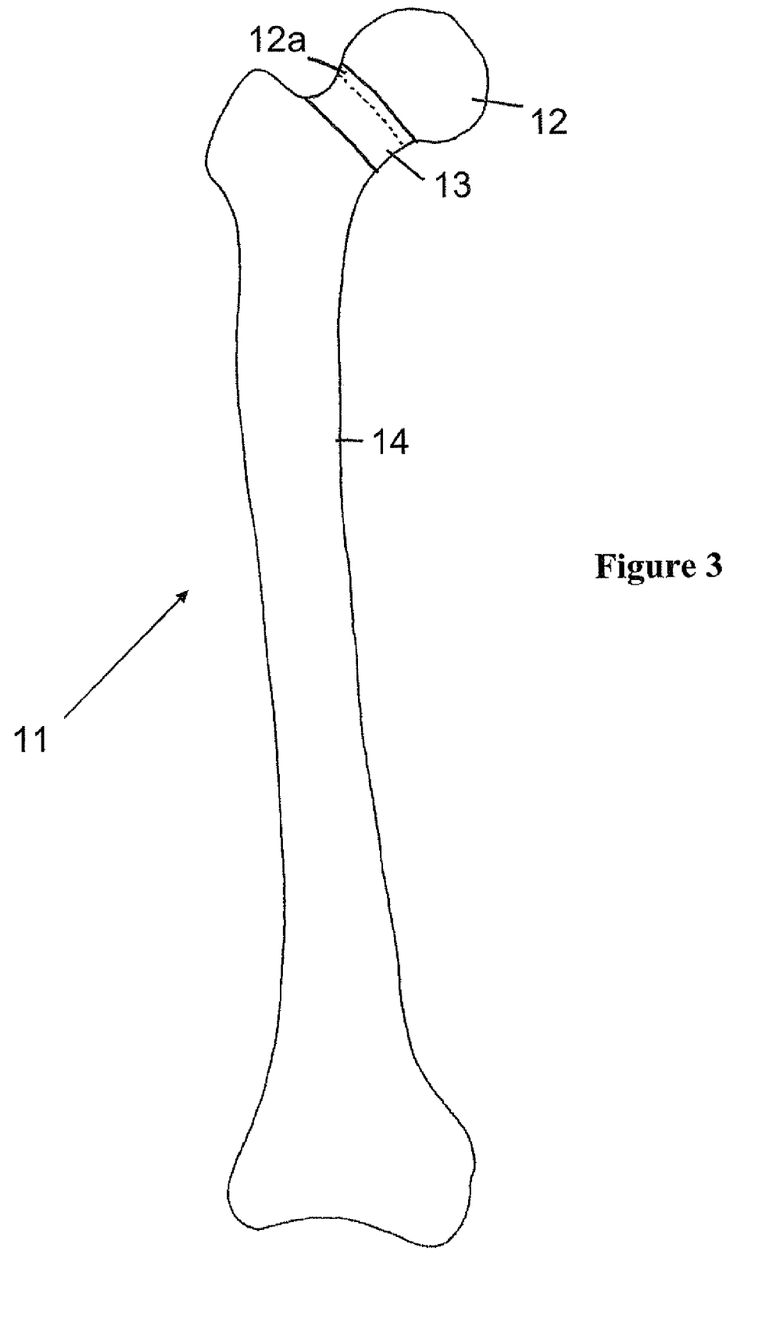
FIG. 3 the segmented femur of a patient.

FIG. 3 shows a femoral bone 11 of an actual patient in an image dataset. In the same way as in FIG. 1, only the contour of the femur 11 is shown, and the grey values of the image data have been omitted. The femur 11 is segmented into a head 12, a neck 13 and a body 14, as explained above. Compared to the head 2 of the femur 1, the head 12 of the femur 11 is slightly flattened on the side opposite the neck 13.

In order to automatically modify the image data set shown in FIG. 3, the object template in the template data set, i.e. the contour of the head 2, is matched to the contour of the head 12, i.e. the anatomical object. This match is preferably achieved using rigid or elastic image fusion. In accordance with the invention, not only is the object template matched to the anatomical object, but the modification template, i.e. the area 2a in the present example, is also adapted. In particular, the transformation rule used for morphing the head 2 onto the head 12 is also used for adapting the modification template 2a, thereby creating the adapted modification template 12a. The adapted modification template 12a is extracted from the template data set and applied to the target data set representing the femur 11. In the present example, the area defined by the adapted modification template 12a is assigned to the femoral head 12, whereby the modification made to the template data set representing the femur 1 is automatically transferred into the target data set representing the femur 11, thereby modifying the target data set which represents the contour of the femoral head 12.

For the sake of presentability, all the data sets are depicted as two-dimensional data sets in the figures. It is however to be understood that all the data sets could be three-dimensional or even four-dimensional, the latter case representing a sequence of three-dimensional data over time.

In this example embodiment, the target data set to be modified represents image data generated by performing medical imaging on a patient, and the object template in the template data set comprises a contour of an actual test object generated by performing medical imaging on a test person. However, the object template could also comprise a generic model of the anatomical object—in the present case, the femoral head 12. The object template could also comprise an atlas containing a generic model of the anatomical object, i.e. the femoral head 12. In particular, this atlas could be the atlas used to segment the image data.

Instead of image data, the target data set to be modified could also represent a generic model of the anatomical object—in this case, the femoral head 12. This model is then matched to the contour of the anatomical object in an image dataset generated by performing medical imaging on a patient. The matched generic model therefore represents the shape, or contour, of the actual anatomical object.

In another alternative, the target data set could represent an atlas containing a generic model of the anatomical object, wherein the atlas is matched to image data generated by performing medical imaging on the patient. This atlas could for example be the atlas used to segment the image data.

In this example embodiment, the anatomical object (the femoral head 12) is a part of a complex structure (the femur 11). The object itself could of course also be such a complex structure. For example, the femur as a whole could be the anatomical object, wherein the modification for example assigns surrounding tissue to the femoral bone. The present invention is applicable not only to a femur but to any anatomical object, such as any bone or organ, the brain, or parts of the same.

Figure 4:
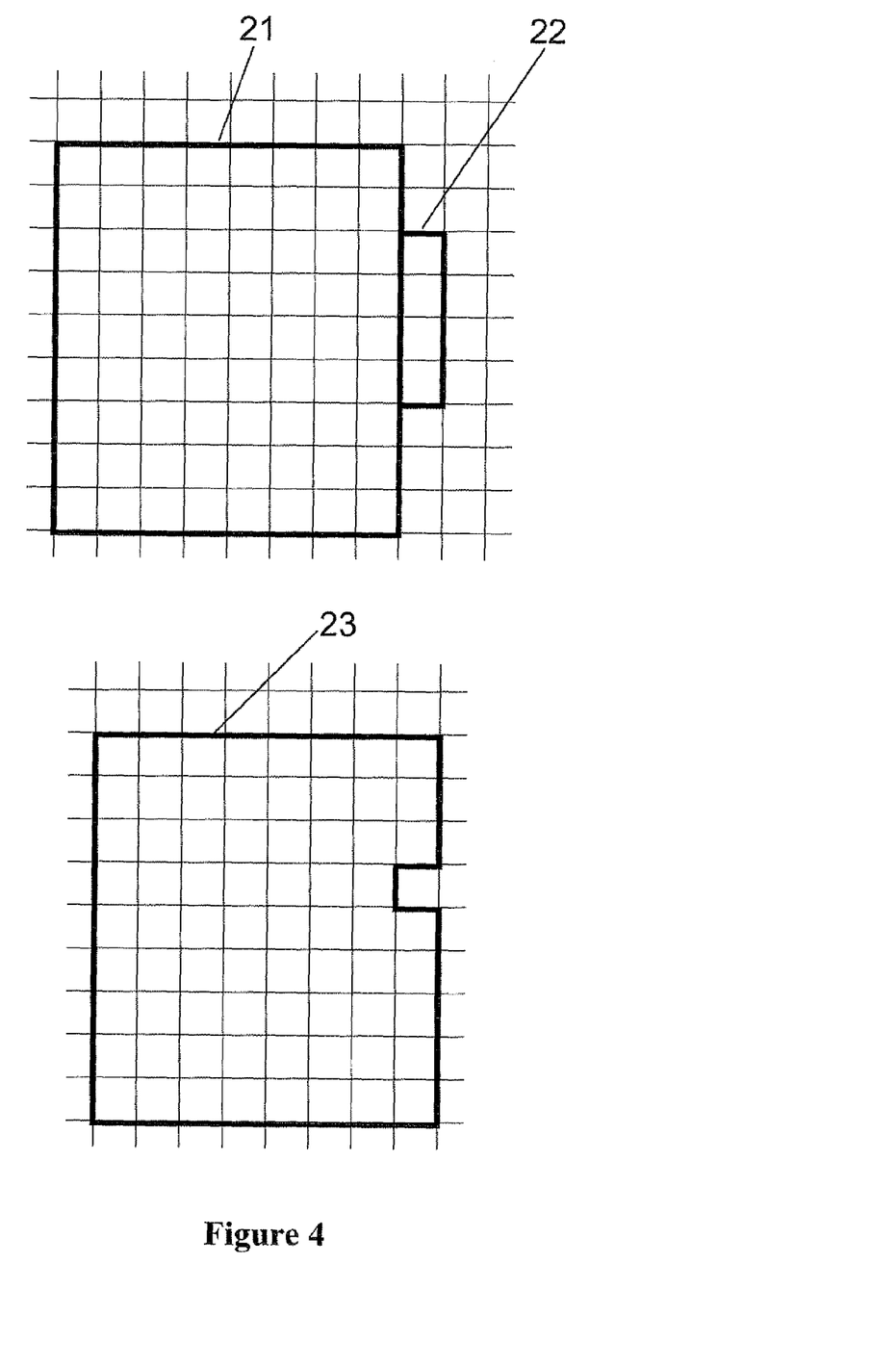
FIG. 4 an object template, a modification template and the contour of an object.

When the adapted modification template is applied to the target data set, a discontinuity may arise between the contour of the anatomical object and the adapted modification template. FIG. 4 shows an example contour of a matched object template 21 and an adapted modification template 22, together with the contour of an anatomical object 23. The contour of the object 23 has a recess, such that when the adapted modification template 22 is added to the contour of the object 23, a gap arises. This can be prevented by the optional step of correcting a border between the object and the adapted modification template. The basic principle for this correction is shown in FIG. 5.

Figure 5A:
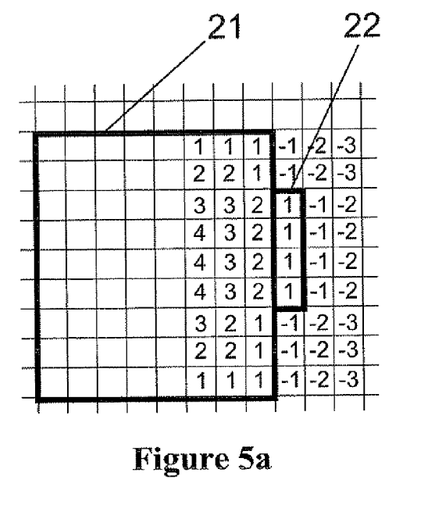
FIG. 5 an example of border correction.

In a first step, a first distance data set is calculated. In this first distance data set, the distance of each pixel (or voxel if three-dimensional data are being processed) from the border, or contour, of the combination of the matched object template 21 and the adapted modification template 22 is calculated. Pixels within the contour have a positive distance, while pixels outside the contour have a negative distance. The distances in FIG. 5 are rounded to integers to increase readability and the example is highly simplified. The distances for a sample of pixels are shown in FIG. 5a.

Figure 5B:
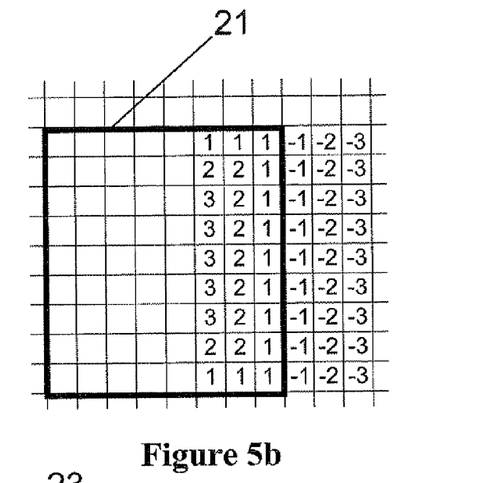

In a second step, a second distance data set is calculated in the same way as the first distance data set, but on the basis of the matched object template only, without the adapted modification template. The distances for a sample of pixels are shown in FIG. 5b.

Figure 5C:
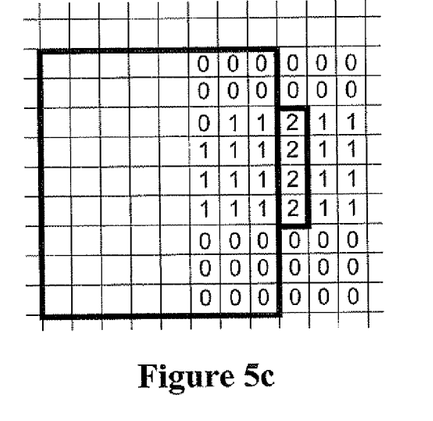

In a third step, a differential data set is calculated by subtracting the distances of the second distance data set from the distances of the first distance data set. This difference is shown in FIG. 5c.

Figure 5D:
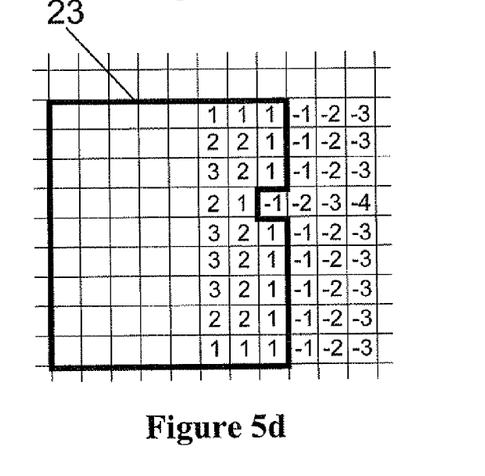

In a fourth step, a third distance data set is calculated for the contour of the anatomical object 23. The fourth step is performed in the same way as the first and second steps, but on the basis of the contour of the anatomical object 23. The distances for a sample of pixels are shown in FIG. 5d.

Figure 5E:
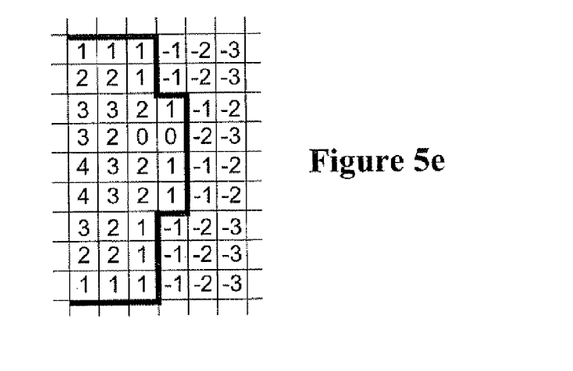

In a fifth step, the distances of the third distance data set are added to the differential data set. The result of this addition is shown in FIG. 5e. Addition and subtraction are always performed pixel by pixel. The third step of calculating the differential data set can be omitted if the fifth step includes subtracting the third distance data set from the sum of the first distance data set and the second distance data set.

In a sixth step, the result of the fifth step (the adding step) is analysed in order to create a corrected contour. The corrected contour is located between neighbouring pixels with different leading signs. As can be seen from FIG. 5e, the corrected contour does not exhibit the gap which would arise if the adapted modification template 23 were simply added to the contour of the anatomical object 23.

Figure 6:
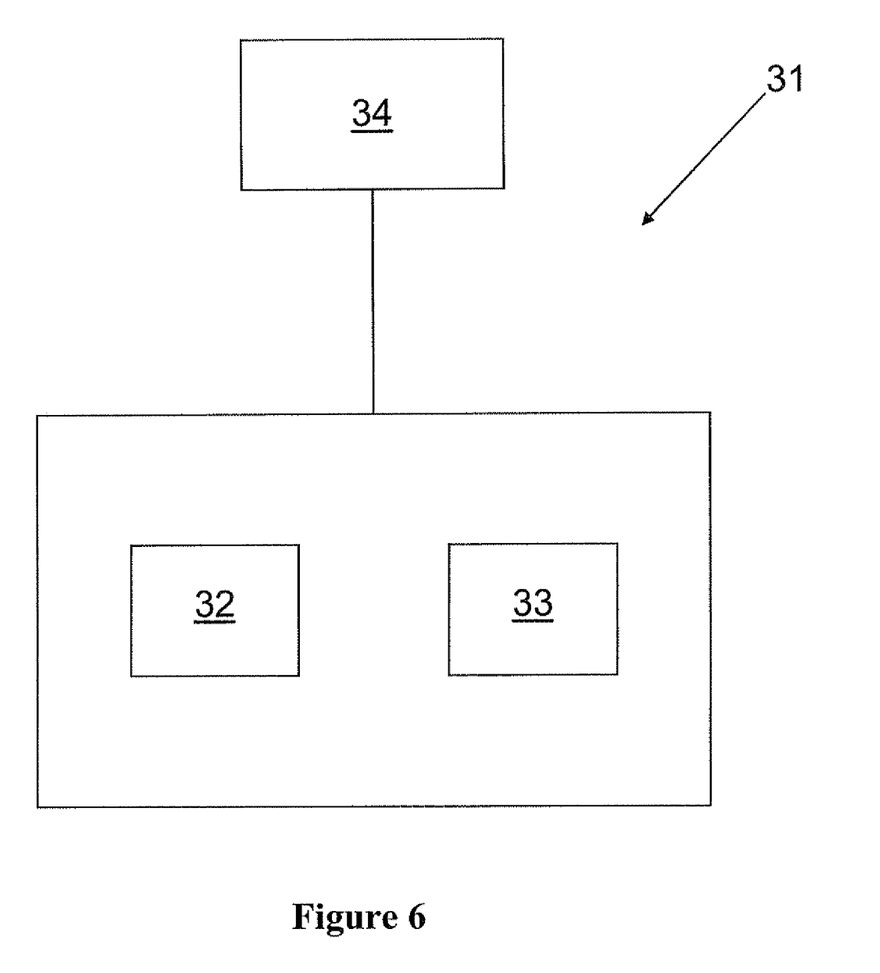
FIG. 6 a computer for implementing the invention.

FIG. 6 shows a schematic representation of a computer 31 for implementing the present invention. The computer 31 comprises a central processing unit 32 for performing the method steps according to the present invention. An interface 33 is provided for receiving data, and a display device 34 is provided for displaying images.

The interface 33 can be used to receive the target data set and/or the template data set and/or a model data set as applicable. For example, the interface 33 can be used to connect the computer 31 to a medical imaging system such as an X-ray, CT or MRT apparatus. The interface 33 can also serve as an interface for an internal or external storage medium which stores the target data set and/or the template data set and/or a model data set as applicable. The display device 34 is provided in order to display the target data set and/or the modified data set and/or an image generated from one or both of these data sets. Using an input device (not shown) of the computer 31, the physician can input the modification template, or data from which the modification template can be calculated, into the computer 31.

An adaptor can be used to assemble multiple parts of the system or to attach the system to another device. Such an adaptor is also part of this invention. An adaptor for fixing a (medical) apparatus to one or two support structures is characterised in that the adaptor is constructed in three parts from a bearing part and two support parts, wherein the bearing part can be connected to the medical apparatus, the first support part can be connected to a first support structure and the second support part can be connected to a second support structure, wherein: the adaptor can assume at least three states, wherein: in the first state, the bearing part is connected free of clearance to the first support part only; in the second state, the bearing part is connected free of clearance to the second support part only; and in the third state, the bearing part is connected free of clearance to the first support part and the second support part.

The invention claimed is:

1. A method for modifying a target data set including a target object representative of a contour of an anatomical object, the method comprising:
using a template data set comprising a modification template and an object template, wherein the modification template represents a first number of first areas or volumes to be added to the contour of the anatomical object and a second number of second areas or volumes to be subtracted from the contour of the anatomical object, matching the object template of the template data set to the target object of the target data set by an amending of the object template such that the object template of the template data set matches the target object representative of the contour of the anatomical object in the target data set, wherein the amending is also applied to the modification template to form an adapted modification template defining a modification;
applying the modification defined by the adapted modification template to the target data set to modify the target object representative of the contour of the anatomical object in the target data set; and
correcting a border between the target object and the adapted modification template to eliminate a disjunctive gap between the target object and the adapted modification template.

2. The method claim 1, wherein the modification template represents a contour to replace the contour of the anatomical object in the target data set.

3. The method of claim 1, wherein the object template in the template data set comprises one or more of:
the contour of an actual test object generated by performing medical imaging on an associated test person;
a generic model of the anatomical object; or
an atlas containing a generic model of the anatomical object.

4. The method of claim 1, wherein the target data set represents one or more of:
image data generated by performing medical imaging on an associated patient, wherein the image data represent at least the anatomical object;
a generic model of the anatomical object, wherein the model is matched to the contour of the anatomical object in image data generated by performing medical imaging on the associated patient; or
an atlas containing a generic model of the anatomical object, wherein the atlas is matched to image data generated by performing medical imaging on the associated patient and the image data represent at least the anatomical object.

5. The method of claim 3, wherein the modification defined by the adapted modification template is made to the template data set manually.

6. The method of claim 4, wherein if the template data set represents an atlas, then:
a modification is made to a model data set and represents the contour of an actual object generated by performing medical imaging on an associated test person or represents the contour of a generic object;

the model data set is matched to the atlas such that the image data of the actual or generic object matches the atlas, thereby also adapting the adapted modification template; and the adapted modification template in the matched model data set is transferred into the template data set as the adapted modification template.

7. The method of claim 4, wherein if the template data set represents an atlas, then:

a modification is made to a model data set and represents the contour of an actual object generated by performing medical imaging on an associated test person or represents the contour of a generic object;

the atlas is matched to the object in the model data set;

the modification is transformed using a transformation which is inverse to the transformation used in the preceding matching step; and the transformed modification is transferred into the template data set as the modification template.

8. The method of claim 1, wherein the match is achieved using elastic or rigid image fusion.

9. The method of claim 1, wherein the modification template comprises an average of multiple input templates.

10. The method of claim 1, wherein the modifying the contour is based on the distances between the voxels or pixels within the target data set and the contour of the object and on the distances between the voxels or pixels within the matched template data set and the contour of the object template and/or the adapted modification template.

11. The method of claim 1, wherein the adapted modification template is amended on the basis of the target data set.

12. A medical imaging system, comprising:
an interface; and
a computer coupled with the interface, the computer comprising a central processing unit (CPU) selectively performing the method of claim 1.

13. A computer program for modifying a target data set including a target object representative of a contour of an anatomical object, embodied on a non-transitory computer-readable medium, which, when running on a computer or when loaded onto a computer, causes the computer to perform the steps of:

using a template data set comprising a modification template and an object template, wherein the modification template represents a first number of first areas or volumes to be added to the contour of the anatomical object and a second number of second areas or volumes to be subtracted from the contour of the anatomical object, matching the object template of the template data set to the target object of the target data set by an amending of the object template such that the object template of the template data set matches the target object representative of the contour of the anatomical object in the target data set, wherein the amending is also correspondingly applied to the modification template to form an adapted modification template defining a modification;

applying the modification defined by the adapted modification template to the target data set to modify the target object representative of the contour of the anatomical object in the target data set; and correcting a border between the target object and the adapted modification template to eliminate a disjunctive gap between the target object and the adapted modification template.

14. A computer storage medium on which the computer program of claim 13 is stored.

15. The method of claim 1, wherein
the matching the object template to the target data set results in a transformation rule; and
the transformation rule is automatically applied to the modification template to form the adapted modification template.

16. The computer program according to claim 4, wherein:
the matching the object template to the target data set results in a transformation rule; and
the transformation rule is automatically applied to the modification template to form the adapted modification template.

17. A method for modifying a target data set including a target object representative of a contour of an anatomical object, the method comprising:

using a template data set comprising a modification template and an object template, wherein the modification template represents a first number of first areas or volumes to be added to the contour of the anatomical object and a second number of second areas or volumes to be subtracted from the contour of the anatomical object, matching the object template of the template data set to the target object of the target data set by an amending of the object template such that the object template of the template data set matches the target object representative of the contour of the anatomical object in the target data set, wherein the amending of the object template is also applied to the modification template to form an adapted modification template defining a modification;

applying the modification defined by the adapted modification template to the target data set to modify the target object representative of the contour of the anatomical object in the target data set; and correcting a border between the target object and the adapted modification template to eliminate a disjunctive gap between the target object and the adapted modification template.

18. A medical imaging system, comprising:
an interface; and
a computer coupled with the interface, the computer comprising a central processing unit (CPU) selectively performing the method of claim 17.

* * * * *